United States Patent [19]

Johnson et al.

[11] Patent Number: 5,704,111

[45] Date of Patent: Jan. 6, 1998

[54] METHOD FOR MAKING A ROTOR FOR AN ELECTRIC MOTOR

[75] Inventors: Roger Neal Johnson, Hagaman; Robert Arvin Hedeen, Clifton Park; Khan Mohamed Khirullah Genghis Khan, Miskayuna, all of N.Y.

[73] Assignee: General Electric Company, Schenectady, N.Y.

[21] Appl. No.: 680,763

[22] Filed: Jul. 15, 1996

Related U.S. Application Data

[63] Continuation-in-part of Ser. No. 449,057, May 24, 1995, abandoned.

[51] Int. Cl.$^6$ .................................................. H02K 15/02
[52] U.S. Cl. .......................... 29/598; 27/451; 310/42; 310/51; 310/156
[58] Field of Search ................ 29/598, 451; 310/42, 310/51, 261, 156

[56] References Cited

U.S. PATENT DOCUMENTS

| | | |
|---|---|---|
| 508,634 | 11/1893 | Priest . |
| 3,107,946 | 10/1963 | Drake . |
| 4,049,985 | 9/1977 | Sudler . |
| 4,471,248 | 9/1984 | Smetana . |
| 4,602,176 | 7/1986 | Baker . |
| 4,617,484 | 10/1986 | Buijsen . |
| 4,704,555 | 11/1987 | Stokes . |
| 4,757,603 | 7/1988 | Stokes . |
| 4,800,308 | 1/1989 | Tice . |
| 4,801,834 | 1/1989 | Stokes . |
| 4,835,840 | 6/1989 | Stokes . |
| 5,027,026 | 6/1991 | Mineta et al. . |
| 5,124,601 | 6/1992 | Miyashita . |
| 5,306,123 | 4/1994 | Day et al. . |
| 5,461,268 | 10/1995 | Sanada . |

OTHER PUBLICATIONS

Abandoned U.S. Patent Application Serial No. 08/449,865, filed May 24, 1995, by Johnson et al., entitled "Rotor for an Electric Motor and Method of Making".

*Primary Examiner*—Carl E. Hall
*Attorney, Agent, or Firm*—Douglas E. Erickson; Marvin Snyder

[57] ABSTRACT

A method for making a rotor for an electric motor. An elastomeric ring loosely slides over a motor shaft and inside a flux ring. End plates are attached to the longitudinal ends of the flux ring so as to longitudinally compress the elastomeric ring which radially inwardly expands against the motor shaft and radially outwardly expands against the flux ring. In a modification, the flux ring has a smaller-diameter annular disk near each of its longitudinal ends, and each attaching end plate longitudinally compresses a longitudinally-shorter elastomeric ring against a corresponding smaller-diameter annular disk.

4 Claims, 1 Drawing Sheet

METHOD FOR MAKING A ROTOR FOR AN ELECTRIC MOTOR

CROSS-REFERENCE TO RELATED APPLICATIONS

The present patent application is a continuation-in-part application of U.S. patent application Ser. No. 08/449,057, by Roger N. Johnson et al. which is entitled "ROTOR FOR AN ELECTRIC MOTOR" and which was filed May 24, 1995, now abandoned.

BACKGROUND OF THE INVENTION

The present invention relates generally to electric motors, and more particularly to a low cost method for making a rotor for an electric motor.

Known electric motors include a conventional electric motor having a cylindrical stator and having a rotor located radially within the stator. Conventional rotors include a cylindrical flux ring attached to a steel shaft. Typical flux rings include those made from iron laminations, those made from solid iron, and those made from compressed iron powder. A particular application may call for a conventional rotor to include permanent magnets mounted on the outside of the flux ring.

Conventional rotors for certain motors, such as electronically-commutated, permanent-magnet, fractional-horse-power motors include two longitudinally-spaced-apart, metal/rubber ring assemblies. Each assembly has an insert-injection molded rubber ring bonded to spaced-apart, radially inner and outer metal (e.g., steel) adapter rings. The rubber ring has radially-inward-facing grooves, and the inner adapter ring has radially-outward-projecting teeth engaging the grooves of the rubber ring. Each assembly is longitudinally located at a corresponding longitudinal end of the flux ring with the radially inner metal adapter ring directly attached to the metal shaft and with the radially outer metal adapter ring directly attached to the flux ring. Such assemblies function to provide torsional vibration absorption between the shaft and the flux ring. It is noted that there is an annular void extending longitudinally between the two assemblies and extending radially between the shaft and the flux ring.

Typically, a rubber products vendor supplies such assemblies to the motor manufacturer. The motor manufacturer takes an assembly, press-fits its inner adapter ring on the shaft, and resistance-welds its outer adapter ring to the flux ring while properly aligning the flux ring with respect to the shaft. Such labor-intensive assembly is costly. What is needed is a less-expensive method for making a rotor for an electric motor.

SUMMARY OF THE INVENTION

It is an object of the invention to provide a method for making a rotor for an electric motor.

The method of the invention is for making a rotor for an electric motor and, in a first embodiment, includes the steps of obtaining a motor shaft, a flux ring, an elastomeric ring, and a pair of annular end plates. The flux ring has an inside diameter greater than the outside diameter of the motor shaft. The elastomeric ring has a relaxed longitudinal length greater than the longitudinal length of the flux ring, a relaxed inside diameter which is greater than the outside diameter of the motor shaft, and a relaxed outside diameter which is smaller than the inside diameter of the flux ring. The annular end plates each have an inside diameter which is greater than the outside diameter of the motor shaft and which is smaller than the outside diameter of the elastomeric ring, and the annular end plates each have an outside diameter which is greater than the inside diameter of the flux ring. The method also includes the step of positioning the elastomeric ring and the flux ring with respect to the motor shaft such that the elastomeric ring circumferentially surrounds, and is generally coaxially aligned with, the motor shaft and such that the flux ring circumferentially surrounds, and is generally coaxially aligned with, the elastomeric ring. The method further includes the step of attaching the annular end plates to the longitudinal ends of the flux ring so as to longitudinally compress, and radially inwardly and outwardly expand, the elastomeric ring.

In a second embodiment, the method includes the steps of obtaining a motor shaft, a flux ring, an elastomeric ring, and an annular end plate. The flux ring has a longitudinal end, a first annular disk located longitudinally inward of the longitudinal end and having an inside diameter greater than the outside diameter of the motor shaft, and a second annular disk located at the longitudinal end and having an inside diameter greater than the inside diameter of the first annular disk. The elastomeric ring has a relaxed longitudinal length greater than the longitudinal distance between the first annular disk and the longitudinal end of the flux ring, a relaxed inside diameter which is greater than the outside diameter of the motor shaft, and a relaxed outside diameter which is greater than the inside diameter of the first annular disk and which is smaller than the inside diameter of the second annular disk. The annular end plate has an inside diameter which is greater than the outside diameter of the motor shaft and which is smaller than the outside diameter of the elastomeric ring, and the annular end plate has an outside diameter which is greater than the inside diameter of the second annular disk. The method also includes the step of positioning the elastomeric ring and the flux ring with respect to the motor shaft such that the elastomeric ring circumferentially surrounds, and is generally coaxially aligned with, the motor shaft and such that the flux ring circumferentially surrounds, and is generally coaxially aligned with, the elastomeric ring. The method further includes the step of attaching the annular end plate to the longitudinal end of the flux ring so as to longitudinally compress the elastomeric ring against the first annular disk and so as to radially inwardly and outwardly expand the elastomeric ring.

Several benefits and advantages are derived from the invention. The elimination of the outer adapter ring of the conventional metal/rubber assembly reduces part costs. The elastomeric ring of the invention, in its relaxed state, has inner and outer diameter clearances with respect to the shaft and the flux ring, allowing for ease of assembly of such parts. The use of end plates (or an end plate and a first annular disk) compress the elastomeric ring causing the elastomeric ring to compressively contact the end plates (or the end plate and a first annular disk), the motor shaft, and the flux ring which secures the elastomeric ring to those parts. Such attachment technique for the elastomeric ring reduces manufacturing costs.

BRIEF DESCRIPTION OF THE DRAWINGS

The accompanying drawings illustrate several rotor constructions made by two preferred embodiments of the method of the present invention wherein.

DETAILED DESCRIPTION OF THE INVENTION

Figure 1:
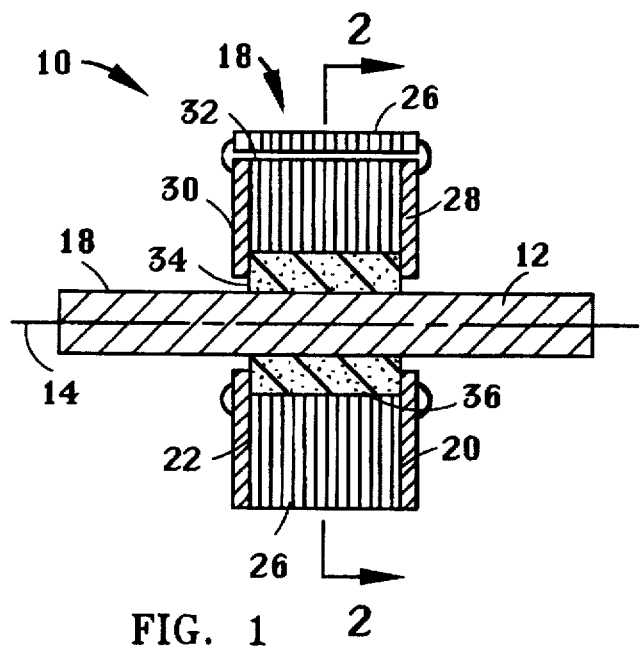
FIG. 1 is a schematic, cross-sectional side view of a first favored construction of a rotor made by a first preferred method of the invention.
Figure 2:
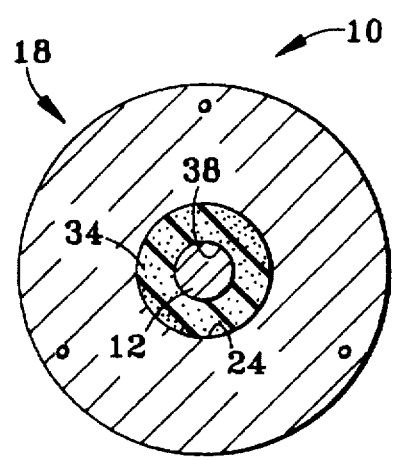
FIG. 2 is a schematic sectional view taken along lines 2—2 in FIG. 1.

Referring now to the drawings, wherein like numerals represent like elements throughout, FIGS. 1 and 2 show a portion of an electric motor, such portion being a first favored construction of the rotor 10 made by a first preferred method of the present invention. The rotor 10 can be for any type of electric motor such as, but not limited to, an AC motor, a DC motor, a constant speed motor, a variable speed motor, or a reversible direction motor. Preferably, the rotor 10 is for an electronically-commutated, permanent-magnet, fractional-horse-power motor which undergoes rapid changes in rotational torque and speed. It is noted that the electric motor, using the rotor 10 of the invention, can be used to power various devices such as, but not limited to, OTR (over-the-range) microwave oven fans, refrigerator pumps, clothes washers, vacuum cleaners, central air conditioners, etc.

The rotor 10 of the invention includes a motor shaft 12 having a generally longitudinally-extending axis 14. The shaft 12 has an outer circumferential surface 16. Preferably, the shaft 12 is a solid cylindrical shaft. In an exemplary embodiment, the shaft 12 consists essentially of steel.

The rotor 10 also includes a flux ring 18 having two longitudinal ends 20 and 22 and generally coaxially aligned with, circumferentially surrounding, and radially spaced apart from the shaft 12. The flux ring 18 has an inner circumferential surface 24. Preferably, the flux ring 18 has a generally constant inside diameter along its longitudinal length, and the shaft 12 has a generally constant outside diameter along that part of its length that is within the surrounding flux ring 18. In an exemplary embodiment the flux ring 18 comprises iron, such as iron laminations, solid iron, or compressed iron powder. In a preferred embodiment, the flux ring 18 comprises a laminated flux ring having stacked-together annular disks 26.

The rotor 10 additionally includes a pair of annular end plates 28 and 30 generally coaxially aligned with, circumferentially surrounding, and radially spaced apart from the shaft 12 and longitudinally surrounding and attached to the longitudinal ends 20 and 22 of the flux ring 18. The radial distance to the shaft 12 of any end plate 28 or 30 is smaller than the radial distance to the shaft 12 of the corresponding longitudinal end 20 or 22 of the flux ring 18. That is, the radial distance of end plate 28 to the shaft 12 is smaller than the radial distance of longitudinal end 20 to the shaft 12, and the radial distance of end plate 30 to the shaft 12 is smaller than the radial distance of longitudinal end 22 to the shaft 12. Preferably, each of the end plates 28 and 30 comprises steel. In a preferred construction, the end plates 28 and 30 are attached to the longitudinal ends 20 and 22 by mechanical fasteners 32 which extend longitudinally through the end plates 28 and 30 and the (preferably laminated) flux ring 18. The mechanical fasteners 32 include, but are not limited to, rivets, pins, and bolts.

The rotor 10 further includes an elastomeric ring 34 generally coaxially aligned with the shaft 12, disposed longitudinally between the end plates 28 and 30, and disposed radially between the shaft 12 and the flux ring 18. The elastomeric ring 34 compressively contacts each of the end plates 28 and 30, the motor shaft 12, and the flux ring 18. Preferably the elastomeric ring 34 is a monolithic ring, but it may also comprise a plurality of attached or unattached ringlets. The elastomeric ring 34 may be made by various methods such as, but not limited to, extruding, molding, or casting. The elastomeric ring 34 has an outer circumferential surface 36 compressively contacting the inner circumferential surface 24 of the flux ring 18 and has an inner circumferential surface 38 preferably compressively contacting the outer circumferential surface 16 of the shaft 12. In an exemplary embodiment, the elastomeric ring 34 longitudinally extends generally the entire longitudinal length of the flux ring 18 (otherwise the end plates 28 and 30 would have their radially-inward portions also extend longitudinally inward into the flux ring 18 to compressively contact the elastomeric ring 34). In a preferred embodiment, generally the entire inner circumferential surface 38 of the elastomeric ring 34 compressively contacts the shaft 12, and generally the entire outer circumferential surface 36 of the elastomeric ring 34 compressively contacts the flux ring 18.

Preferably, the elastomeric ring 34 consists essentially of styrene butadiene. However, the choice of materials for the elastomeric ring 34 is left to the artisan. For example, in a preferred design, it is desired that the torsional natural frequency of the assembled rotor be less than, or equal to, generally seventy-five percent of the anticipated torsional excitation frequency, as can be appreciated by those skilled in the art. By mathematical analysis or empirical testing, the elastomeric material or materials for the elastomeric ring 34 and the degree of resilience thereof (or inversely, the degree of rigidity/hardness thereof) can be chosen to meet that design criterion, as is within the skill of those experienced in the art.

It is noted that in assembling the rotor 10 of the invention, it is preferred that the elastomeric ring 34, in its relaxed state, have an inside diameter which is greater than the outside diameter of the shaft 12 by a clearance gap and have an outside diameter which is smaller than the inside diameter of the flux ring 18 by a clearance gap. The clearance gaps allow the shaft 12, the elastomeric ring 34, and the flux ring 18 to be easily assembled together. A preferred method for making the rotor 10 includes the step of obtaining a motor shaft 12 and a flux ring 18, such shaft 12 having an outside diameter, and such flux ring 18 having an inside diameter greater than the outside diameter of the shaft 12. Preferably, the shaft 12 consists essentially of steel, and the flux ring 18 comprises iron, such as iron laminations, solid iron, or compressed iron powder. In an exemplary method, the flux ring 18 has a generally constant inside diameter along its longitudinal length, and the shaft 12 has a portion which has a longitudinal length at least equal to that of the flux ring 18 and which has a generally constant outside diameter along such longitudinal length of such portion. Such clearance gaps are small to maintain the concentricity of the flux ring 18 with respect to the shaft 12 during assembly. In its relaxed state, the elastomeric ring 34 preferably has a longer longitudinal length than that of the flux ring 18. It is noted that the attachment of the end plates 28 and 30 to the longitudinal ends 20 and 22 of the flux ring 18 compress the elastomeric ring 34 causing the elastomeric ring 34 to also compressively contact the shaft 12 and the flux ring 18 which eliminates the clearance gaps, centers the flux ring 18 on the shaft 12, and secures the flux ring 18 to the shaft 12. It is expected that at least a five-to-ten percent cost savings will be achieved in making the rotors of the invention over making conventional rotors for electric motors.

Thus, it is seen that the first preferred method for making a rotor 10 for an electric motor includes steps a) through f). Step a) includes the step of obtaining a motor shaft 12 having a generally longitudinally-extending axis 14. Step b) includes the step of obtaining a flux ring 18 having longitudinal ends 20 and 22 and an inside diameter greater than the outside diameter of the motor shaft 12. Step c) includes the step of obtaining an elastomeric ring 34 having a relaxed longitudinal length greater than the longitudinal length of the flux ring 18, having a relaxed inside diameter which is greater than the outside diameter of the motor shaft 12, and having a relaxed outside diameter which is smaller than the inside diameter of the flux ring 18. Step d) includes the step of disposing the elastomeric ring 34 and the flux ring 18 with respect to the motor shaft 12 such that the elastomeric ring 34 circumferentially surrounds, and is generally coaxially aligned with, the motor shaft 12 and such that the flux ring 18 circumferentially surrounds, and is generally coaxially aligned with, the elastomeric ring 34. Step e) includes the step of obtaining a pair of annular end plates 28 and 30 each having an inside diameter which is greater than the outside diameter of the motor shaft 12 and which is smaller than the outside diameter of the elastomeric ring 34 and each having an outside diameter which is greater than the inside diameter of the flux ring 18. Step f) includes the step of attaching the pair of annular end plates 28 and 30 to the longitudinal ends 20 and 22 of the flux ring 18 so as to longitudinally compress, and radially inwardly and outwardly expand, the elastomeric ring 34. It is noted that, during step d), the elastomeric ring 34 radially inwardly expands against the motor shaft 12 and radially outwardly expands against the flux ring 18.

Figure 3:
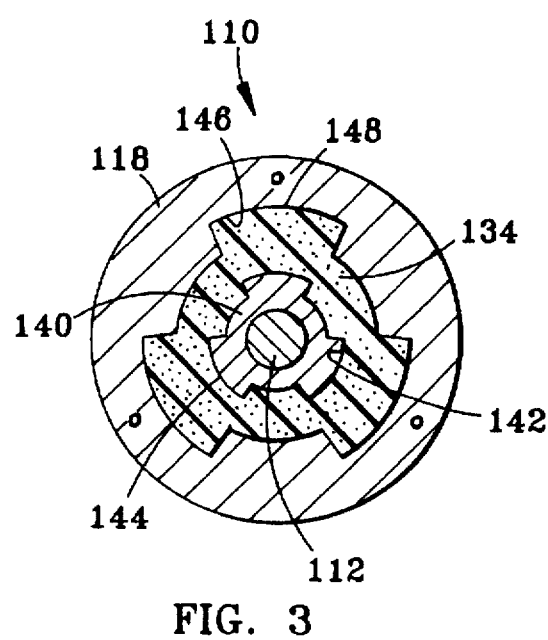
FIG. 3 is a schematic sectional view, similar to that of FIG. 2, but showing a second favored construction of the rotor made by the first preferred method of the invention.

FIG. 3 shows a second favored construction of the rotor 110 made by the first preferred method of the invention. Rotor 110 is identical to the first embodiment of the rotor 10 previously described except for differences as hereinafter noted.

In rotor 110, the motor shaft 112 includes a rod portion 139 and a metal adapter ring 140 generally coaxially aligned with, circumferentially surrounding, and attached to the rod portion 139. In an exemplary embodiment, the adapter ring 140 comprises steel and is attached to the rod portion 139 by a press-fit. Preferably, the elastomeric ring 134 includes longitudinally-extending and radially-inward-facing grooves 142, and the adapter ring 140 has longitudinally-extending and radially-outward-projecting teeth 144 engaging the grooves 142 of the elastomeric ring 134. In a preferred construction, the teeth 144 of the adapter ring 140 consist of three generally identical teeth having a shape of a generally sixty-degree segment of a circular ring and circumferentially spaced apart an angular distance of generally sixty degrees.

Preferably, the flux ring 118 includes longitudinally-extending and radially-inward-facing grooves 146, and the elastomeric ring 134 includes longitudinally-extending and radially-outward-projecting teeth 148 engaging the grooves 146 of the flux ring 118. In a preferred construction, the teeth 148 of the elastomeric ring 134 consist of three generally identical teeth having a shape of a generally sixty-degree segment of a circular ring and circumferentially spaced apart an angular distance of generally sixty degrees. In an exemplary embodiment, the teeth 148 and the grooves 142 of the elastomeric ring 134 are radially aligned. It is noted that the teeth 144 and 148 and grooves 142 and 146 of the second favored embodiment of the invention allow for higher torque transmission between the shaft 112 and the flux ring 118 than is possible between the shaft 12 and the flux ring 18 of the first favored embodiment of the invention.

It is noted that the previously-described first preferred method of the invention is also used for making the rotor 110 (with the disposing in step d) also requiring that teeth 144 are engaged in grooves 142 and that teeth 148 are engaged in grooves 146). With rotor 110, the elastomeric ring 134 radially inwardly expands against the metal adapter ring 140 of the motor shaft 112 and does not compressively contact the rod portion 139 of the motor shaft 112.

Figure 4:
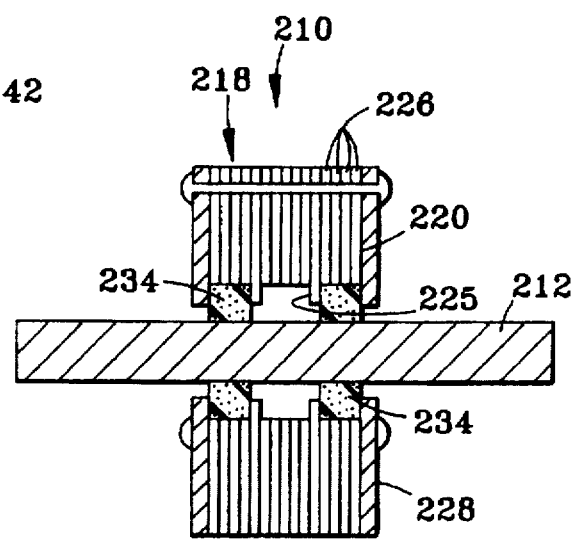
FIG. 4 is a schematic, cross-sectional side view of a third favored construction of the rotor made by a second preferred method of the invention.

FIG. 4 shows a third favored construction of the rotor 210 made by a second preferred method of the invention. Rotor 210 is identical to the first favored construction of the rotor 10 previously described except for differences as hereinafter noted. In rotor 210, there are two elastomeric rings 234, one for the right side and one for the left side of the rotor 210. As the right side and the left side of the rotor 210 are identical, only the right side will be described. Here, the flux ring 218 is a laminated flux ring having a first annular disk 225 and a second annular disk 227 (and preferably other annular disks 226 longitudinally disposed between the first and second annular disks 225 and 227). The first annular disk 225 is disposed longitudinally inward of the (right) longitudinal end 220 of the flux ring 218 and has an inside diameter greater than the outside diameter of the motor shaft 212. The second annular disk 227 is disposed at the longitudinal end 220 of the flux ring 218 and has an inside diameter greater than the inside diameter of the first annular disk 225. Each of any longitudinally intervening annular disks 226 also has an inside diameter greater than the inside diameter of the first annular disk 225. The elastomeric ring 234 is disposed longitudinally between the first annular disk 225 and the end plate 228 and is disposed radially between the shaft 212 and the flux ring 218. The elastomeric ring 234 compressively contacts the first annular disk 225, the end plate 228, the flux ring 218, and the motor shaft 212.

The second preferred method for making rotor 210, which is similar to the first preferred method for making rotor 10, includes steps a) through f). Step a) includes the step of obtaining a motor shaft 212 having a generally longitudinally-extending axis 214. Step b) includes the step of obtaining a flux ring 218 with a longitudinal end 220, a first annular disk 225 disposed longitudinally inward of the longitudinal end 220 and having an inside diameter greater than the outside diameter of the motor shaft 212, and a second annular disk 227 disposed at the longitudinal end 220 and having an inside diameter greater than the inside diameter of the first annular disk 225. Step c) includes the step of obtaining an elastomeric ring 234 having a relaxed longitudinal length greater than the longitudinal distance between the first annular disk 225 and the longitudinal end 220 of the flux ring 218, a relaxed inside diameter which is greater than the outside diameter of the motor shaft 212, and having a relaxed outside diameter which is greater than the inside diameter of the first annular disk 225 and which is smaller than the inside diameter of the second annular disk 227. Step d) includes the step of disposing the elastomeric ring 234 and the flux ring 218 with respect to the motor shaft 212 such that the elastomeric ring 234 circumferentially surrounds, and is generally coaxially aligned with, the motor shaft 212 and such that the flux ring 218 circumferentially surrounds, and is generally coaxially aligned with, the elastomeric ring 234. Step e) includes the step of obtaining an annular end plate 228 having an inside diameter which is greater than the outside diameter of the motor shaft 212 and which is smaller than the outside diameter of the elastomeric ring 234 and having an outside diameter which is greater than the inside diameter of the second annular disk 227. Step f) includes the step of attaching the annular end plate 228 to the longitudinal end 220 of the flux ring 218 so as to longitudinally compress the elastomeric ring 234 against the first annular disk 225 and so as to radially inwardly and outwardly expand the elastomeric ring 234. It is noted that, during step d), the elastomeric ring 234 radially inwardly expands against the motor shaft 212 and radially outwardly expands against the flux ring 218.

The foregoing description of two preferred methods for making several favored constructions of the rotor 10, 110, and 210 of the invention has been presented for purposes of illustration. It is not intended to be exhaustive or to limit the invention to the precise form disclosed, and obviously many modifications and variations are possible in light of the above teaching. For example, a rotor for an electric generator is considered to be a rotor for an electric motor for the purposes of describing the invention, since an electric generator can be operated as an electric motor. It is intended that the scope of the invention be defined by the claims appended hereto.

We claim:

1. A method for making a rotor for an electric motor comprising the steps of:
   a) obtaining a motor shaft having a generally longitudinally-extending axis;
   b) obtaining a flux ring having longitudinal ends and an inside diameter greater than the outside diameter of said motor shaft;
   c) obtaining an elastomeric ring having a relaxed longitudinal length greater than the longitudinal length of said flux ring, having a relaxed inside diameter which is greater than the outside diameter of said motor shaft, and having a relaxed outside diameter which is smaller than the inside diameter of said flux ring;
   d) disposing said elastomeric ring and said flux ring with respect to said motor shaft such that said elastomeric ring circumferentially surrounds, and is generally coaxially aligned with, said motor shaft and such that said flux ring circumferentially surrounds, and is generally coaxially aligned with, said elastomeric ring;
   e) obtaining a pair of annular end plates each having an inside diameter which is greater than the outside diameter of said motor shaft and which is smaller than the outside diameter of said elastomeric ring and each having an outside diameter which is greater than the inside diameter of said flux ring; and
   f) attaching said pair of annular end plates to the longitudinal ends of said flux ring so as to longitudinally compress, and radially inwardly and outwardly expand, said elastomeric ring.

2. The method of claim 1, wherein during step d) said elastomeric ring radially inwardly expands against said motor shaft and radially outwardly expands against said flux ring.

3. A method for making a rotor for an electric motor comprising the steps of:
   a) obtaining a motor shaft having a generally longitudinally-extending axis;
   b) obtaining a flux ring with a longitudinal end, a first annular disk disposed longitudinally inward of said longitudinal end and having an inside diameter greater than the outside diameter of said motor shaft, and a second annular disk disposed at said longitudinal end and having an inside diameter greater than the inside diameter of said first annular disk;
   c) obtaining an elastomeric ring having a relaxed longitudinal length greater than the longitudinal distance between said first annular disk and the longitudinal end of said flux ring, having a relaxed inside diameter which is greater than the outside diameter of said motor shaft, and having a relaxed outside diameter which is greater than the inside diameter of said first annular disk and which is smaller than the inside diameter of said second annular disk;
   d) disposing said elastomeric ring and said flux ring with respect to said motor shaft such that said elastomeric ring circumferentially surrounds, and is generally coaxially aligned with, said motor shaft and such that said flux ring circumferentially surrounds, and is generally coaxially aligned with, said elastomeric ring;
   e) obtaining an annular end plate having an inside diameter which is greater than the outside diameter of said motor shaft and which is smaller than the outside diameter of said elastomeric ring and having an outside diameter which is greater than the inside diameter of said second annular disk; and
   f) attaching said annular end plate to the longitudinal end of said flux ring so as to longitudinally compress said elastomeric ring against said first annular disk and so as to radially inwardly and outwardly expand said elastomeric ring.

4. The method of claim 3, wherein during step f) said elastomeric ring radially inwardly expands against said motor shaft and radially outwardly expands against said flux ring.

* * * * *